United States Patent
Izawa et al.

(10) Patent No.: US 11,976,366 B2
(45) Date of Patent: May 7, 2024

(54) SLIDING MEMBER AND MEMBER FOR INTERNAL COMBUSTION ENGINE

(71) Applicants: NISSAN MOTOR CO., LTD., Yokohama (JP); FUKUDA METAL FOIL & POWDER CO., LTD., Kyoto (JP)

(72) Inventors: Yoshinori Izawa, Kanagawa (JP); Junichi Arai, Kanagawa (JP); Katsunori Otobe, Kyoto (JP); Shinichi Nishimura, Kyoto (JP)

(73) Assignees: NISSAN MOTOR CO., LTD., Yokohama (JP); FUKUDA METAL FOIL & POWDER CO., LTD., Kyoto (JP)

( * ) Notice: Subject to any disclaimer, the term of this patent is extended or adjusted under 35 U.S.C. 154(b) by 640 days.

(21) Appl. No.: 17/264,414

(22) PCT Filed: Jun. 13, 2019

(86) PCT No.: PCT/JP2019/023452
§ 371 (c)(1),
(2) Date: Jan. 29, 2021

(87) PCT Pub. No.: WO2020/026604
PCT Pub. Date: Feb. 6, 2020

(65) Prior Publication Data
US 2021/0324913 A1 Oct. 21, 2021

(30) Foreign Application Priority Data
Aug. 2, 2018 (JP) .................................. 2018-146275

(51) Int. Cl.
*F16C 3/12* (2006.01)
*B22F 1/08* (2022.01)
(Continued)

(52) U.S. Cl.
CPC ................ *C23C 28/02* (2013.01); *B22F 1/08* (2022.01); *B22F 3/24* (2013.01); *B22F 5/008* (2013.01);
(Continued)

(58) Field of Classification Search
CPC ..... C23C 24/08; C23C 24/082; C23C 24/021; C23C 24/04; C23C 24/00; C23C 28/02;
(Continued)

(56) References Cited

U.S. PATENT DOCUMENTS 5,004,581 A 4/1991 Takagi et al.
2006/0093736 A1 5/2006 Raybould et al.
(Continued)

FOREIGN PATENT DOCUMENTS

EP 3 333 283 A1 6/2018
JP 2002-348677 A 12/2002
(Continued)

*Primary Examiner* — Michael E. La Villa
(74) *Attorney, Agent, or Firm* — Foley & Lardner LLP

(57) ABSTRACT

A sliding member of the present invention includes a base material and a coating layer that is formed on the base material. The coating layer includes a particle aggregate, and the particle aggregate contains two or more kinds of precipitation hardened copper alloy particles that have different compositions. The sliding member has high coating strength and superior wear resistance.

11 Claims, 1 Drawing Sheet

(51) Int. Cl.

| | |
|---|---|
| *B22F 3/24* | (2006.01) |
| *B22F 5/00* | (2006.01) |
| *B22F 5/10* | (2006.01) |
| *B22F 7/06* | (2006.01) |
| *B22F 7/08* | (2006.01) |
| *B32B 15/01* | (2006.01) |
| *B32B 15/04* | (2006.01) |
| *B32B 15/16* | (2006.01) |
| *B32B 15/18* | (2006.01) |
| *B32B 15/20* | (2006.01) |
| *C22C 1/04* | (2023.01) |
| *C22C 9/00* | (2006.01) |
| *C23C 24/00* | (2006.01) |
| *C23C 24/08* | (2006.01) |
| *C23C 28/00* | (2006.01) |
| *C23C 28/02* | (2006.01) |
| *C23C 30/00* | (2006.01) |
| *F01L 3/02* | (2006.01) |
| *F01L 3/04* | (2006.01) |
| *F16C 33/10* | (2006.01) |
| *F16C 33/12* | (2006.01) |
| *F16C 33/14* | (2006.01) |
| *B22F 1/05* | (2022.01) |
| *C22C 9/06* | (2006.01) |
| *C23C 24/04* | (2006.01) |

(52) U.S. Cl.
CPC ............ *B22F 5/106* (2013.01); *B22F 7/062* (2013.01); *B22F 7/08* (2013.01); *B32B 15/01* (2013.01); *B32B 15/015* (2013.01); *B32B 15/04* (2013.01); *B32B 15/043* (2013.01); *B32B 15/16* (2013.01); *B32B 15/18* (2013.01); *B32B 15/20* (2013.01); *C22C 1/0425* (2013.01); *C22C 9/00* (2013.01); *C23C 24/00* (2013.01); *C23C 24/08* (2013.01); *C23C 24/082* (2013.01); *C23C 28/021* (2013.01); *C23C 28/023* (2013.01); *C23C 28/026* (2013.01); *C23C 28/027* (2013.01); *C23C 28/44* (2013.01); *C23C 30/00* (2013.01); *C23C 30/005* (2013.01); *F01L 3/02* (2013.01); *F01L 3/04* (2013.01); *F16C 33/1095* (2013.01); *F16C 33/121* (2013.01); *F16C 33/14* (2013.01); *B22F 1/05* (2022.01); *B22F 2003/242* (2013.01); *B22F 2301/10* (2013.01); *B22F 2304/10* (2013.01); *B22F 2999/00* (2013.01); *C22C 9/06* (2013.01); *C23C 24/04* (2013.01); *F01L 2303/00* (2020.05); *F01L 2820/01* (2013.01); *F16C 2202/04* (2013.01); *F16C 2223/42* (2013.01); *F16C 2240/06* (2013.01); *F16C 2360/22* (2013.01); *Y10T 428/12882* (2015.01); *Y10T 428/12903* (2015.01); *Y10T 428/12917* (2015.01); *Y10T 428/12917* (2015.01); *Y10T 428/12924* (2015.01); *Y10T 428/12993* (2015.01); *Y10T 428/2495* (2015.01); *Y10T 428/24967* (2015.01); *Y10T 428/265* (2015.01)

(58) Field of Classification Search
CPC ... C23C 28/023; C23C 28/026; C23C 28/027; C23C 28/44; C23C 30/00; C23C 30/005; B22F 2999/00; B22F 1/08; B22F 1/05; B22F 1/09; B22F 3/24; B22F 5/008; B22F 5/106; B22F 7/062; B22F 7/08; B22F 2003/242; B22F 2301/10; C22C 1/0425; C22C 9/06; C22C 9/00; F01L 3/02; F01L 3/04; F01L 2303/00; F01L 2820/01; F01L 2202/04; F01L 2223/42; F01L 2240/06; F01L 2360/22; F16C 33/1095; F16C 33/121; F16C 33/14; B32B 15/015; B32B 15/01; B32B 15/04; B32B 15/043; B32B 15/16; B32B 15/18; B32B 15/20; Y10T 428/12882; Y10T 428/12903; Y10T 428/1291; Y10T 428/12917; Y10T 428/12924; Y10T 428/12993; Y10T 428/265; Y10T 428/2495; Y10T 428/24967

See application file for complete search history.

(56) References Cited

U.S. PATENT DOCUMENTS

| | | | |
|---|---|---|---|
| 2015/0273584 A1 | 10/2015 | Masuda et al. | |
| 2018/0223902 A1* | 8/2018 | Izawa | C23C 30/00 |
| 2021/0293274 A1* | 9/2021 | Izawa | C23C 24/08 |

FOREIGN PATENT DOCUMENTS

| | | | | |
|---|---|---|---|---|
| JP | 2008-519157 A | 6/2008 | | |
| JP | 2013-144849 A | 7/2013 | | |
| JP | 2013-147717 A | 8/2013 | | |
| KR | 10-2005-0065930 A | 6/2005 | | |
| WO | WO 2014/065279 A1 | 5/2014 | | |
| WO | WO-2017022505 A1 * | 2/2017 | ............... | C22C 9/00 |

* cited by examiner

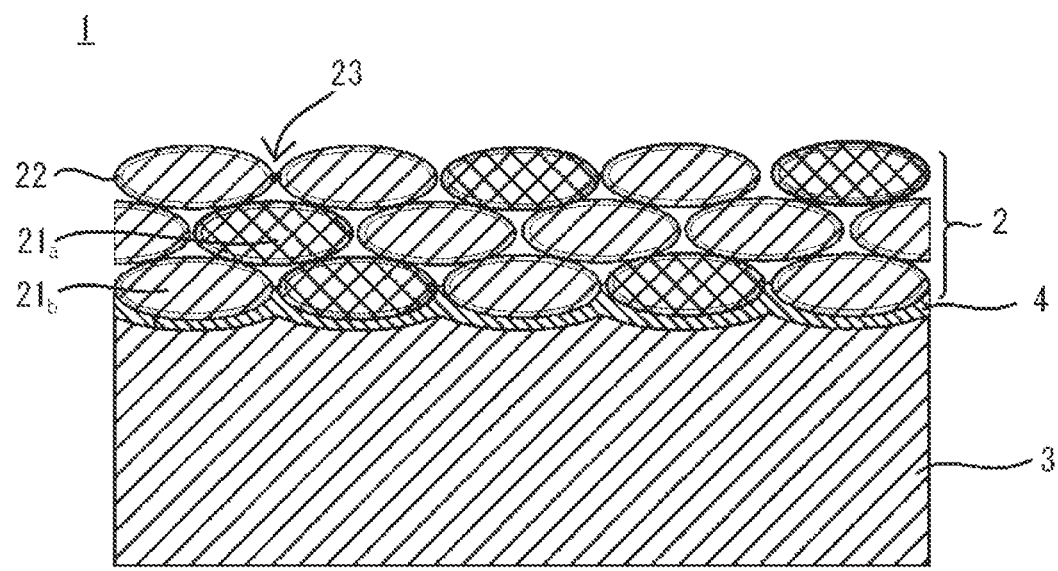

SLIDING MEMBER AND MEMBER FOR INTERNAL COMBUSTION ENGINE

TECHNICAL FIELD

The present invention relates to a sliding member, and more specifically relates to a sliding member having improved wear resistance.

BACKGROUND ART

Aluminum and aluminum alloy are light-weight and high-strength materials and are thus suitably used for reducing weight of, e.g., automobiles. Meanwhile, aluminum and aluminum alloy have low wear resistance, and therefore, in the case of using them in a member having a sliding part for an internal combustion engine, a surface of a base material containing aluminum is covered in order to improve wear resistance.

Patent Document 1 discloses a method to cover a surface of a base material containing aluminum, with particles, by spraying the particles thereonto with the use of low temperature gas. The particles are metal particles, such as of titanium, nickel, iron, aluminum, cobalt, or copper, or the particles are alloy particles containing such metal. The sprayed particles are plastically deformed by kinetic energy and are adhered to the surface of the base material.

CITATION LIST

Patent Document

Patent Document 1: JP2008-519157A

SUMMARY OF INVENTION

Technical Problem

However, according to the method disclosed in Patent Document 1, the coating layer cannot be formed unless the material particles, which are sprayed onto the base material, contain metal particles that are soft enough to plastically deform by spraying.

In a case of adding hard particles, such as of tungsten carbide or silicon nitride, the hard particles are only embedded into the soft particles, which provides weak chemical bond between particles. As a result, the coating layer does not have strength, and wear resistance is not sufficiently obtained.

The present invention has been made in view of these problems in the conventional art, and an object thereof is to provide a sliding member including a high strength coating layer and having superior wear resistance.

Solution to Problem

The inventors of the present invention have made an intensive research to achieve the above object and have found the following findings. That is, two or more kinds of precipitation hardened copper alloy particles that have different compositions are used to form a coating layer, whereby the precipitation hardened copper alloy particles are plastically deformed to be physically adhered to each other, and moreover, they form a reaction layer and are also chemically bonded to each other. Thus, the present invention has been completed.

That is, a sliding member of the present invention includes a base material and a coating layer that is formed on the base material.

The coating layer includes a particle aggregate, and the particle aggregate contains two or more kinds of precipitation hardened copper alloy particles that have different compositions.

Moreover, a member for an internal combustion engine of the present invention includes a sliding part.

The sliding part is provided with the sliding member.

Advantageous Effects of Invention

In the present invention, the coating layer is formed of the particle aggregate that contains two or more kinds of the precipitation hardened copper alloy particles having different compositions. Thus, the present invention provides a sliding member including a high strength coating layer and having superior wear resistance.

BRIEF DESCRIPTION OF DRAWINGS

FIG. 1 is a sectional schematic view of a sliding member of the present invention.

DESCRIPTION OF EMBODIMENTS

<Sliding Member>

A sliding member of the present invention will be described in detail.

As illustrated in FIG. 1, the sliding member includes a base material 3 and a coating layer 2 that is formed thereon, and the coating layer 2 is formed of a particle aggregate that contains two or more kinds of precipitation hardened copper alloy particles 21a and 21b having different compositions.

In the present invention, the phrase "different compositions" means that additional elements other than copper may be metals of different type or may be metals of the same type with a different concentration.

The precipitation hardened copper alloy particles can be formed by spraying particles in a supersaturated solid solution state onto a surface of a base material with the use of a cold spray method, which will be described later. When the particles in a solid phase state collide with the base material, an impact generates e.g., heat and stress, which cause precipitation and hardening of the component that is solid solved in an amount greater than the solid solubility limit. The particles thus become the precipitation hardened copper alloy particles.

The particles in the supersaturated solid solution state are soft and have high deformability. Therefore, these particles are plastically deformed and are melted by locally generated heat, upon colliding with a surface of a base material after the particles in the solid phase state are sprayed thereonto. This occurs, e.g., atomic diffusion, whereby the particles form a reaction layer including a diffusion layer and intermetallic compounds. As a result, the particles form a particle aggregate in which precipitation hardened copper alloy particles are strongly bonded to each other, whereby coating strength is improved.

In this manner, the particles in the supersaturated solid solution state harden by precipitation hardening and form a coating layer of a particle aggregate in which the precipitation hardened copper alloy particles are strongly bonded to each other. Thus, these particles enable forming a sliding member that has superior wear resistance.

Alloy particles that contain copper as a main component, have high deformability, and contain the following additional element, can be used as the particles in the supersaturated solid solution state. The additional element is a metal element having such an atomic radius as to be able to be dispersed into a crystal lattice of copper. Note that the phrase "main component" in the present invention means a component that is contained in an amount of 80 mass % or greater.

Examples of the particles in the supersaturated solid solution state include Cu—Ni—Si alloy particles, Cu—Co—Si alloy particles, Cu—Cr alloy particles, Cu—Zr alloy particles, and Cu—Ti alloy particles.

Among them, the alloy particles containing Si are preferably used, because they form a film of $SiO_2$ due to diffusion of Si to a surface, and this film acts as a passive film to improve corrosion resistance of the coating layer.

The hardness of the particles in the supersaturated solid solution state is preferably 200 Hv or lower at normal temperature, although depending on the composition of the particles.

When the particles are hard copper alloy particles in which the solid solved amount of the additional element is small and crystal grains are preliminarily precipitated, the precipitated crystal grains inhibit deformation of the copper alloy particles and decrease deformability. Thus, the copper alloy particles cannot absorb stress in collision and are broken, resulting in difficulty in formation of the coating layer.

The particles in the supersaturated solid solution state can be produced by a water atomizing method.

Specifically, these particles can be produced such that melted metal containing an additional element in an amount greater than the solid solubility limit is flowed down, and high pressure water is blown thereto, whereby the melted metal is atomized and is rapidly cooled and solidified into particles.

An average size (D50) of the particles in the supersaturated solid solution state is preferably 20 to 40 μm.

Decreasing the average grain size of the particles in the supersaturated solid solution state enables forming a dense coating. However, particles having an excessively small particle size hardly plastically deform in spraying due to having small kinetic energy, whereby adhesion between the particles may be reduced, and strength of the coating layer may be lowered.

In the particle aggregate, at least one kind of the precipitation hardened copper alloy particles preferably have Vickers hardness of from 150 to 250 Hv. Containing the precipitation hardened copper alloy particles that have hardness in this range enables forming the particle aggregate, because these particles plastically deform.

In addition, containing a large amount of the relatively soft precipitation hardened copper alloy particles reduces a porosity and improves coating strength.

The difference in hardness between the two or more kinds of the precipitation hardened copper alloy particles is preferably 200 Hv or smaller, and more preferably 60 Hv or smaller.

When the difference in hardness between the precipitation hardened copper alloy particles is greater than 200 Hv, only softer precipitation hardened copper alloy particles plastically deform, and harder precipitation hardened copper alloy particles do not plastically deform. Thus, the surface temperature of the harder precipitation hardened copper alloy particles does not rise, which makes it difficult to occur atomic diffusion, whereby bonding strength of a particle aggregate may be lowered, and wear resistance may be reduced.

The crystal grains in the precipitation hardened copper alloy particles are preferably nanocrystals that have an average grain size of smaller than 1 μm. Fine crystal grains in the precipitation hardened copper alloy particles improve strength of the coating layer.

In the coating layer, a porosity in cross section is preferably 3 area % or smaller, and preferably 1 area % or smaller. The coating layer being dense with a small amount of pores has improved strength and has improved wear resistance.

The porosity in cross section of the coating layer, and the average grain size of the precipitation hardened copper alloy particles, can be calculated by analyzing an image, which is obtained by binarizing a scanning electron microscope image (SEM image) in image processing. The average grain size is an equivalent circular diameter and is a diameter of a circle having the same area as a projected area of a particle image.

Although depending on temperature and sliding environment at a part at which the sliding member is used, the thickness of the coating layer is, for example, preferably from 0.05 to 5.0 mm, and more preferably from 0.1 to 0.5 mm.

When the thickness is less than 0.05 mm, strength of the coating layer itself may be insufficient, and plastic deformation may occur in a case in which strength of the base material is low. On the other hand, when the thickness exceeds 5.0 mm, the coating layer may easily come off in accordance with a relationship between interface adhesion and residual stress that occurs in deposition.

The base material is not specifically limited, and a metal that is conventionally used for a sliding member of an internal combustion engine can be used, but an aluminum alloy can be preferably used because of its high thermal conductivity.

Examples of the aluminum alloy include AC2A, AC8A, and ADC12, which are defined in Japanese Industrial Standards.

The sliding member is superior in wear resistance and can be suitably used for members having a sliding part for an internal combustion engine, for example, a piston, a piston ring, a piston pin, a cylinder, a crankshaft, a camshaft, and a valve lifter.

<Manufacturing Method of Sliding Member>

The sliding member can be manufactured by spraying raw material particles onto a surface of a base material with the use of a cold spray method. The raw material particles contain copper as a main component and also contain two or more kinds of particles in a supersaturated solid solution state that have different compositions.

The cold spray method is a method for forming a coating layer by making particles in a supersaturated solid solution collide with a base material together with inert gas, in a supersonic flow, in a condition in which the particles are not melted and not gasified but in a solid phase state. The cold spray method can minimize oxidation of the coating layer due to heat, unlike a method for forming a coating layer by melting metal particles of a material, such as a thermal spraying method.

With the use of the cold spray method, in response to collision of the particles in the supersaturated solid solution state and in the solid phase state, with the base material, the particles themselves and the base material 3 are plastically deformed to form a plastically deformed part 22. Moreover, the additional component in the amount exceeding the solid solubility limit is precipitated and hardened, whereby the particles become precipitation hardened copper alloy particles 21.

Then, a part of kinetic energy is converted into thermal energy, and surfaces of the precipitation hardened copper alloy particles 21 are melted by the locally generated heat and are solidified, or atomic diffusion occurs, whereby the precipitation hardened copper alloy particles are bonded to each other, resulting in formation of the coating layer 2.

At this time, the temperatures of the base material 3 and the particles in the supersaturated solid solution state are at the melting point of the solid solution particles or lower. Thus, the locally melted surfaces of the particles in the supersaturated solid solution state are rapidly cooled to form amorphous substance and nanocrystals at interfaces 23 between the particles in the supersaturated solid solution state.

The amorphous substance and the nanocrystals have great strain and atoms can easily move. This facilitates diffusion and enhances bonding strength.

In the particle aggregate of the precipitation hardened copper alloy particles 21 thus formed, the surfaces of the precipitation hardened copper alloy particles 21 are locally melted and solidified, and the particle aggregates of the entire coating layer is bonded into one body. However, the precipitation hardened copper alloy particles 21 do not form an uniform structure, but form the interfaces 23, and the plastically deformed parts 22 that contain amorphous substance and nanocrystals are present in the vicinity of the interfaces 23.

In this sense, it is different from a coating layer in which metal particles of a material are completely melted or dissolved and solidified to form an uniform structure without forming the plastically deformed part, by, e.g., thermal spraying.

In addition, an intermediate layer 4 that includes a diffusion layer and an intermetallic compound layer is formed between the base material 3 and the coating layer 2. Due to rapid cooling of the melted surfaces of the particles in the supersaturated solid solution state, the intermediate layer 4 is thinner than an intermediate layer that is formed by a thermal spraying method or sintering, and the intermediate layer 4 has a film thickness of 2 µm or less.

The amorphous substance at an interface of the precipitation hardened copper alloy particles, and the crystal grains in the precipitation hardened copper alloy particles, can be recognized by analyzing a crystal orientation from a projected pattern. The projected pattern is obtained such that a diffraction pattern is projected on a detector surface by electron backscatter diffraction (EBSD) performed in a scanning electron microscope (SEM).

The spray velocity of the particles in the supersaturated solid solution state is preferably from 300 to 1200 m/s, and preferably from 500 to 1000 m/s. When the spray velocity is lower than 300 m/s, stress for plastically deforming the particles in the supersaturated solid solution state is small, whereby precipitation hardening may not be sufficient, and the porosity may increase.

The pressure of working gas for spraying the particles in the supersaturated solid solution state is preferably from 2 to 5 MPa, and more preferably from 3.5 to 5 MPa. When the pressure of the working gas is lower than 2 MPa, it may be difficult to obtain the above-described particle velocity.

Although depending on the kind of the particles in the supersaturated solid solution state, the temperature of the working gas is preferably from 400 to 800° C. and more preferably from 500 to 700° C.

When the temperature of the working gas is lower than 400° C. the particles in the supersaturated solid solution state hardly plastically deform, whereby the porosity may increase, and coating strength may be lowered. On the other hand, when the temperature of the working gas exceeds 800° C., there is a risk of decrease in strength due to oxidation.

Examples of the working gas include nitrogen gas and helium gas, and they may be used alone or in combination.

EXAMPLES

The present invention will be detailed with reference to Examples hereinafter, but the present invention is not limited to Examples described below.

Example 1

In the state of being already worked into a seat of an engine valve of a cylinder head, an aluminum material (A5056BE-H112) was preprocessed on the condition that a target thickness of the coating layer was 0.2 mm, whereby an aluminum base material was prepared.

The aluminum base material was mounted on a rotation table, and raw material particles were cold sprayed under the following condition while the rotation table was rotated, whereby a coating layer of from 0.4 to 0.5 mm was formed. The raw material particles contain particles in a supersaturated solid solution state (composition: (mass %) Cu-3Ni-0.7Si, average particle size (d50): 27.7 µm) and another particles in a supersaturated solid solution state (composition: Cu-6Ni-1.4Si, average particle size (d50): 26.8 µm) at a mass ratio of 80:20. Both of these particles in the supersaturated solid solution state were produced by a water atomizing method.

A deposition rate of the solid solution particles is shown in Table 1.

High-pressure cold spray equipment: manufactured by Plasma Giken Kogyo Co., Ltd., PCS-1000

Working gas: nitrogen

Gas pressure in chamber: 4 MPa

Gas temperature in chamber: 600° C. (temperature of particles in collision was approximately 200° C.)

Particle velocity: from 680 to 720 m/s

Particle feed amount: 7 g/min

The coating layer was finished into the shape of a seat of an engine valve of an actual cylinder head so as to have a thickness of 0.2 mm, whereby a sliding member was obtained.

Example 2

A sliding member was obtained in the same manner as in Example 1, except for using raw material particles that contain particles in a supersaturated solid solution state (composition: Cu-3Ni-0.7Si, average particle size (d50): 27.7 µm) and another particles in a supersaturated solid solution state (composition: (mass %) Cu-14Ni-3Si-2V-2.2Cr-1.4Fe-1.2Al, average particle size (d50): 33.2 µm) at a mass ratio of 80:20.

Comparative Example 1

A sliding member was obtained in the same manner as in Example 1, except for using the particles in the supersaturated solid solution state (composition: (mass %) Cu-3Ni-0.7Si, average particle size (d50): 27.7 µm) alone.

Comparative Example 2

A sliding member was obtained in the same manner as in Example 1, except for using the particles in the supersaturated solid solution state (composition: (mass %) Cu-6Ni-1.4Si, average particle size (d50): 26.8 μm) alone.

Comparative Example 3

A sliding member was obtained in the same manner as in Example 1, except for using the particles in the supersaturated solid solution state (composition: (mass %) Cu-14Ni-3Si-2V-2.2Cr-1.4Fe-1.2Al, average particle size (d50): 33.2 μm) alone.

<Evaluation>

The sliding members were evaluated by the following methods. The results of the Evaluation are Shown in Table 1.

(Observation of Coating Structure)

Electron backscatter diffraction (EBSD) was performed by using a scanning electron microscope (SEM) to observe the structure of the coating layer, and existence of a plastically deformed part and an intermediate layer were confirmed from the composition of precipitated crystal grains in the precipitation hardened copper alloy particles, porosity, grain size of the precipitated crystal grains, and existence of amorphous substance.

(Measurement of Hardness of Precipitation Hardened Copper Alloy Particles)

While difference in the components was observed in a composition image of the scanning electron microscope (SEM), measurement was performed in the same field of view in accordance with "Vickers hardness test (JIS Z 2244)".

(Wear Resistance)

A wear amount of the sliding member after a corrosion resistance test, was measured under the following condition by using a valve seat abrasion testing machine, which is manufactured by Takachiho Seiki Co., Ltd.

Specifically, the shapes of the seat of the engine valve of the cylinder head before and after the test, were obtained by using a shape measurement apparatus, and wear amounts of four positions were measured. The measured values were averaged, and a wear ratio relative to Comparative Example 1 was calculated from the average.

Mating valve member: SUH35
Test temperature: 325° C.
Vertical speed: 3000 times/min
Number of revolutions of valve: 5 rpm
Number of seating operations: 540000 times

TABLE 1

|  |  |  |  | Example 1 | Example 2 |
|---|---|---|---|---|---|
| Raw Material Particles | First Particles | Composition (mass %) |  | Cu—3Ni—0.7Si | Cu—3Ni—0.7Si |
|  |  | Average Grain Size D50% |  | 27.7 μm | 27.7 μm |
|  | Second Particles | Composition |  | Cu—6Ni—1.4Si | Cu—14Ni—3Si—2V—2.2Cr—1.4Fe—1.2Al |
|  |  | Average Grain Size D50% |  | 26.8 μm | 33.2 μm |
|  | Mixed Ratio (First:Second) |  |  | 80:20 | 80:20 |
|  | Deposition Rate |  |  | 95.6% | 90.7% |
| Coating Layer | Coating Thickness |  |  | 0.2 mm | 0.2 mm |
|  | First Particles | Area Ratio |  | 84.2% | 88.9% |
|  |  | Hardness |  | 205 Hv | 208 Hv |
|  | Second Particles | Area Ratio |  | 15.3% | 10.1% |
|  |  | Hardness |  | 255 Hv | 390 Hv |
|  | Porosity |  |  | 0.4% | 0.3% |
|  | Difference in Hardness between First Particle Phase and Second Particle Phase |  |  | 50 Hv | 182 Hv |
|  | Existence of Plastically Deformed Part |  |  | Existed | Existed |
|  | Existence of Intermediate Layer |  |  | Existed | Existed |
|  | Wear Amount of Valve Seat (Wear Ratio) |  |  | 0.62 | 0.84 |

|  |  |  | Comparative Example 1 | Comparative Example 2 | Comparative Example 3 |
|---|---|---|---|---|---|
| Raw Material Particles | First Particles | Composition (mass %) | Cu—3Ni—0.7Si | Cu—6Ni—1.4Si | Cu—14Ni—3Si—2V—2.2Cr—1.4Fe—1.2Al |
|  |  | Average Grain Size D50% | 27.7 μm | 26.8 μm | 33.2 μm |

TABLE 1-continued

|  |  |  |  |  |
|---|---|---|---|---|
| Second Particles | Composition | — | — | — |
|  | Average Grain Size D50% | — | — | — |
|  | Mixed Ratio (First:Second) | 100:— | 100:— | 100:— |
| Coating Layer | Deposition Rate | 98.0% | 97.5% | 70.9% |
|  | Coating Thickness | 0.2 mm | 0.2 mm | 0.2 mm |
|  | First Particles Area Ratio | 99.4% | 99.2% | 99.0% |
|  | First Particles Hardness | 211 Hv | 259 Hv | 385 Hv |
|  | Second Particles Area Ratio | — | — | — |
|  | Second Particles Hardness | — | — | — |
|  | Porosity | 0.1% | 0.7% | 0.5% |
|  | Difference in Hardness between First Particle Phase and Second Particle Phase | — | — | — |
|  | Existence of Plastically Deformed Part | Existed | Existed | Existed |
|  | Existence of Intermediate Layer | Existed | Existed | Existed |
|  | Wear Amount of Valve Seat (Wear Ratio) | 1.00 | 1.70 | 1.04 |

The results of Table 1 show that the sliding members of Examples, in which the coating layer that contained the two or more kinds of the precipitation hardened copper alloy particles having different compositions was formed, had superior wear resistance, compared with Comparative Examples containing one kind of the precipitation hardened copper alloy particles.

REFERENCE SIGNS LIST

1 Sliding member
2 Coating layer
21a Precipitation hardened copper alloy particles
22b Precipitation hardened copper alloy particles
22 Plastically deformed part
23 Interface
3 Base material
4 Intermediate layer

The invention claimed is:

1. A sliding member comprising:
a base materials; and
a coating layer that is formed on the base material, wherein:
the coating layer comprises a particle aggregate that contains two or more kinds of precipitation hardened copper alloy particles having different compositions.

2. The sliding member according to claim 1, wherein at least one of the two or more kinds of the precipitation hardened copper alloy particles that form the particle aggregate has Vickers hardness in a range of 150 Hv to 250 Hv, as measured using a Vickers hardness test according to Japanese Industrial Standard JIS Z 2244.

3. The sliding member according to claim 2, wherein a difference in hardness between a first kind among the two or more kinds of the precipitation hardened copper alloy particles and a second kind among the two or more kinds of the precipitation hardened copper alloy particles is 200 Hv or smaller.

4. The sliding member according to claim 2, wherein a difference in hardness between a first kind among the two or more kinds of the precipitation hardened copper alloy particles and a second kind among the two or more kinds of the precipitation hardened copper alloy particles is 60 Hv or smaller.

5. The sliding member according to claim 1, wherein a difference in hardness between a first kind among the two or more kinds of the precipitation hardened copper alloy particles and a second kind among the two or more kinds of the precipitation hardened copper alloy particles is 200 Hv or smaller.

6. The sliding member according to claim 1, wherein a difference in hardness between a first kind among the two or more kinds of the precipitation hardened copper alloy particles and a second kind among the two or more kinds of the precipitation hardened copper alloy particles is 60 Hv or smaller.

7. The sliding member according to claim 1, wherein at least one of the base material and the coating layer includes a plastically deformed part.

8. The sliding member according to claim 1, comprising at least one of an amorphous substance and a nanocrystal at an interface between the particles that form the coating layer.

9. The sliding member according to claim 1, comprising an intermediate layer at least at a part between the base material and the coating layer, the intermediate layer containing at least one of a diffusion layer and an intermetallic compound layer.

10. The sliding member according to claim 9, wherein the intermediate layer has a film thickness of 2 μm or less.

11. A sliding member of an internal combustion engine, comprising the sliding member according to claim 1 at a sliding part of the internal combustion engine.

* * * * *